United States Patent [19]

Montmory

[11] 4,362,271

[45] Dec. 7, 1982

[54] PROCEDURE FOR THE ARTIFICIAL MODIFICATION OF ATMOSPHERIC PRECIPITATION AS WELL AS COMPOUNDS WITH A DIMETHYL SULFOXIDE BASE FOR USE IN CARRYING OUT SAID PROCEDURE

[75] Inventor: Robert Montmory, St. Islier, France

[73] Assignee: Agence Nationale de Valorisation de la Recherche (ANVAR), Paris, France

[21] Appl. No.: 201,802

[22] Filed: Oct. 29, 1980

[30] Foreign Application Priority Data

Nov. 2, 1979 [FR] France .............................. 79 27135
Jun. 20, 1980 [FR] France .............................. 80 13745

[51] Int. Cl.³ .................... A01G 15/00; E01H 13/00
[52] U.S. Cl. ..................................... 239/2 R; 568/27
[58] Field of Search ................... 239/2 R, 14; 568/27

[56] References Cited

U.S. PATENT DOCUMENTS 3,045,051  7/1962  Coma et al. .......................... 568/27

Primary Examiner—Andres Kashnikow
Attorney, Agent, or Firm—Cushman, Darby & Cushman

[57] ABSTRACT

A process for artificially modifying atmospheric precipitation wherein a liquid composition containing dimethyl sulfoxide as the principal ingredient is dispersed into the atmosphere from a container in microdroplet form having an average diameter ranging from 1 to 10 microns.

33 Claims, No Drawings

PROCEDURE FOR THE ARTIFICIAL MODIFICATION OF ATMOSPHERIC PRECIPITATION AS WELL AS COMPOUNDS WITH A DIMETHYL SULFOXIDE BASE FOR USE IN CARRYING OUT SAID PROCEDURE

The subject of this invention is a procedure for the artificial modification of atmospheric precipitation as well as compounds with a dimethyl sulfoxide base for use in carrying out said procedure.

More specifically, the procedure for the artificial modification of atmospheric precipitation covered by this application makes it possible to locally induce rain, dissipate fog and prevent hail.

The techniques advocated previously for modifying atmospheric precipitation are based largely on cloud seeding with small solid particles of ice-forming agents or agents which modify the condensation and coalescence processes.

It is known that clouds are formed by the lifting of volumes of damp atmospheric air to colder regions where the water vapor pressure exceeds the saturation point, so that condensation occurs in the form of extremely small droplets of water. When the cloud is lifted by updrafts to altitudes at which the temperature is below 0° C., the droplets remain liquid in the supercooled state. The solid phase (ice) tends not to arise except at temperatures below about $-15°$ C. and on condition that certain specific particles, known as ice nucleii, are present. The latter are not numerous, about 1 per liter at $-15°$ C. These (primary) ice crystals generally multiply under the influence of the convection currents by either fragmentation or collision, often followed by bursting as a result of thermal shock with the drops of supercooled water. These mechanisms taken together result in the formation of (secondary) crystals whose concentration is very high in comparison to that of the natural ice nucleii.

To artificially stimulate precipitation from such clouds, the procedure used heretofore consisted in introducing artificial ice nucleii, particularly silver iodide particles, into the cold part of the cloud, thereby substantially increasing the number of ice nucleii.

Hail, which may be formed in clouds whose peaks are at subfreezing temperatures, is the consequence of an alteration in the multiplication processes of the primary ice crystals, and the hailstone results from the aggregation around a central nucleus of either supercooled drops or of ice fragments. The phenomena resulting in its formation are still not very well known.

Some theories on the prevention of hail maintain that large hailstones cannot be formed if the number of secondary ice embryos is sufficiently low for mutual competition to be avoided. This hypothesis is the basis for the majority of the prevention techniques that consist in injecting artificial ice nucleii into the cloud to induce competition between the ice-forming embryos.

The latter in general are solid particles of silver iodide or of certain organic compounds such as phloroglucinol and urea. According to this theory, the competition which stems from the number of ice nucleii will result in less growth of the hailstones.

However, even though this method has been applied for about 30 years, its results are still debatable. It is uncertain whether the results held to be positive have any significance. Above all, however, experience has shown that, in certain cases, this technique can result in increases in hail showers. See, for example, David Atlas, "The Paradox of Hail Suppression," *Science,* Jan. 14, 1977, Vol. 195, No. 4274, pp. 139–145.

In addition, certain theoretical considerations and experimental observations call into question the possibility of combatting hail by seeding with small particles of silver iodide, quite apart from the seeding techniques proper which themselves are the subject of controversy.

It is hence necessary to consider that that method of fighting hail can yield favorable results at best under certain special circumstances.

Yet these uncertainties or failures have not to date led to the development of more effective techniques, and many authors still advocate the use of silver iodide particles.

It is true nonetheless that attempting to prevent hail by means of the competition of ice-forming embryos amounts to creating an additional population of ice crystals which themselves may, under certain conditions, become hailstones. In the final analysis, this appears not to be the most judicious approach.

It has also been proposed that the dispersion effect of hygroscopic nucleii be used, but the latter are difficult to disperse and the dilution effect attributable to the growth of the drops results in diminished concentration of the hygroscopic substance which makes it impossible to avoid congealing; also proposed has been the combined effect of dispersing hygroscopic nucleii followed by the dispersion of ice nucleii, but this avenue of approach is highly debatable, especially inasmuch as it does nothing to alter the criticisms just expressed with regard to the hygroscopic nucleii and the ice nucleii.

To stimulate precipitation in "warm clouds," i.e., clouds which have developed at a temperature above 0° C., there has been strong support for the dispersion of large, artificial condensation nucleii in the form of solid particles of hygroscopic products such as sodium chloride, calcium chloride, etc., or certain hydrophilic materials capable of absorbing large quantities of water vapor, such as the salts of alginic acid, especially sodium alginate.

However, these methods present, inter alia, the drawbacks associated with the very principle of using solid particles, namely the following:

solid particles are more difficult to disperse than liquid particles;

solid surfaces are more sensitive to the effects of contamination;

the energy required to adsorb water vapor on a solid surface is much greater than that needed for a liquid surface;

it is difficult to obtain, store and disperse solid microparticles with dimensions measuring a few microns, and, in practice, the solid particles generally have larger dimensions, so that for equal numbers of condensation nucleii, the mass to be dispersed is greater in the case of solid particles than in the case of liquids.

The subject of the present invention is a procedure which makes it possible to stimulate precipitation artificially both in clouds and in fog at temperatures above freezing, and in clouds and in fog at temperatures below freezing, which at the same time constitutes a hail prevention technique which is not based on the hypothesis of competition between ice-forming embryos.

Instead, this procedure is designed, in the case of hail prevention, first to considerably increase the population of midsized droplets (from about 10 to 30 microns) in the area or areas of accumulation, then to make these droplets stable, i.e., minimize the fraction of them which would be susceptible of freezing at temperatures between 0° C. and −40° C.

The invention is also based on the choice of seeding using liquid particles.

Indeed, it has emerged that using a solid particle dispersion is not a good choice for various physical reasons. For example, the well-known sensitivity of solid particles, especially ice nucleii, to all sorts of contamination imparts a certain randomness to the transition of water from the vapor phase to the liquid phase, as well as to the transition from the supercooled liquid phase to the solid phase, on a small solid particle. In addition, it is known that silver iodide particles are rapidly deactivated by radiation, especially ultraviolet radiation.

One major merit of the present procedure is precisely the production of hydrometeors in the liquid, instead of solid, state.

The condensation of a vapor on a liquid surface is infinitely less sensitive to contamination effects. This fact is widely known from theory and experiment.

Furthermore, there is almost no energy consumed by the adsorption of water vapor on a surface of liquids such as those used in the present procedure, or consumption is in any case infinitely less than the energy required to create a liquid phase, and hence all the moreso for a solid phase (especially by deposition), on a solid particle.

The present procedure consists in dispersing, in an atmosphere likely to give rise to precipitations such as a cloud of fog, microdroplets which will expand extremely rapidly once the relatively humidity of the air exceeds 40 to 50 percent and will reach, at saturation, with respect to ice (below 0° C.) and with respect to water (above 0° C.), dimensions which can be as great as 50 to 100 microns or even more, all while remaining in the liquid state, even supercooled at temperatures below freezing, despite the effects of dilution.

This result is obtained in accordance with the invention by dispersing in the said atmosphere microdroplets which preferably have average diameters that may range from 1 to 10 microns, especially from 1 to 6 microns, the said microdroplets being obtained from a liquid composition containing dimethyl sulfoxide (DMSO) as its principal ingredient.

DMSO has the capacity of forming hydrogen bonds and hence of modifying the structure of the liquid water while stabilizing it.

While the applicant does not consider himself constrained by theoretical considerations to any one particular mechanism of action, it is conceivable that, in cold clouds and in hail formation areas, the DMSO will act in particular through its ability to keep the droplets in the supercooled state even at very low temperatures.

DMSO and the properties which characterize it have been described in particular by S. W. Jacob, E. E. Rosenbaum and D. C. Wood, Dimethylsulfoxide 1 (Basic concepts of DMSO), M. Dekker (1971).

Generally, the composition used in the procedure according to the invention contains more than 50 percent, and preferably at least 80 percent, DMSO by weight.

The procedure according to the invention is preferably used with a composition also containing at least one additional ingredient, said additional ingredient being a material soluble in the dimethyl sulfoxide and having a vapor tension less than that of the dimethyl sulfoxide. This additional ingredient presents the advantage of stabilizing the microdroplets while preventing or limiting their evaporation. To do this, it is preferable for the said material to have a vapor tension substantially lower than that of DMSO, for example equal at most to half that of DMSO. The material in question is generally a solid. It is preferably a hygroscopic material whose presence makes it possible to increase the hydrophilic power of the DMSO.

The said material is preferably a salt. The salts are selected in particular from among the salts of lithium, sodium, potassium, ammonium, magnesium and calcium, and/or from among the chlorides, iodides, nitrates, phosphates and thiocyanates.

Particular reference may be made to the following salts:

sodium chloride, lithium chloride, lithium iodide, and calcium chloride;

sodium iodide or potassium iodide, lithium nitrate, sodium nitrate, ammonium nitrate, magnesium nitrate, calcium nitrate, potassium thiocyanate and magnesium chloride;

ammonium chloride or ammonium iodide.

The material added to the DMSO may also be a hygroscopic organic product such as urea.

DMSO is a good solvent for pesticides and fungicides. Its effect of stimulating precipitation or dispersing fog may thus be associated with a curative or preventive effect which is useful in agriculture.

To carry out the procedure according to the invention, standard devices which make it possible to pulverize liquids in the form of microdroplets are used. These devices are particularly containers provided with devices to generate microdroplets.

The said devices for generating microdroplets are apparatuses which generally combine two functions, one of them consisting in ejecting the liquid through a tube, with the help of a gas jet, in such a way as to transform it into a fine-droplet aerosol, and the other function consisting in propelling said aerosol a certain distance (from several meters to roughly ten meters). The gas jet may be obtained either from a gas compressor or from compressed gas, or from turbines which provide an extremely high gas flow. Among the latter type of devices, mention may be made of the apparatus marked by the VOLUMAIR Company (Ivry-sur-Seine, France).

To carry out the procedure according to the invention, the microdroplets may be dispersed either from the ground (in the case of fog) or from aerial devices such as rockets, airplanes or helicopters adapted to contain the dispersion equipment (in the case of stimulating rain or preventing hail). The aerial seeding procedure is carried out using known techniques, either in the clouds or at their base, or even in the frontal zone of a storm cell.

To prevent hail, the composition according to the invention is generally dispersed in the very center of a potential hail-producing cloud before the first hailstones are formed.

Also the subject of the present invention are the compositions such as defined above which may be used as agents for modifying atmospheric precipitation.

The invention further covers the said compositions in a container associated with a microdroplet generator.

The compositions covered by the present application are also dispersions in the form of microdroplets having the dimensions referred to above.

The quantities of the composition to be used depend on the desired effect.

In the case of clearing fog, the quantity to be dispersed depends on the opacity of the fog, i.e. on the number of droplets per cm$^3$ and their size range, the volume of the area to be cleared and various meteorological factors including the temperature and the impact of air turbulence on dispersion. By way of example, using one or more microdroplet generators, from 2 to 50 kg of composition may be dispersed for every km$^2$ to be treated. In the case of stimulating rain, the quantities to be dispersed will depend on the type of cloud involved and on the dynamic and microphysical parameters characterizing it, such as rising currents, convection, granulometric spectrum, etc. By way of example, from 50 to 200 kg of composition may be dispersed using one or more microdroplet generators.

For hail prevention, one might, for example, disperse the composition transported by rocket into the zone or zones of accumulation which are characterized by a pronounced radar echo. The rockets, such as those of the Oblako type, carry about 5 kg of the composition to be dispersed, for example. Rocket launches will be spaced over time depending on developments observed with the help of the criteria selected, starting with radar echos.

In a cloud medium where the vapor level is near 100 percent, the growth of the microdroplets of the composition according to the invention to drops measuring 50 to 100 microns or even more is virtually spontaneous. For dispersions of solid particles of sodium chloride, for example, the rate of growth of the formed drops is substantially lower. The latency time corresponding to the time required for the solid particle to dissolve must also be taken into account.

The rate of growth of the droplets starting from an aerosol of the composition according to the invention (e.g. for a composition of LiCl+DMSO or LiI+DMSO) is very rapid.

The remarkable stability of the droplets obtained after the growth of the microdroplets, even for dilution ratios on the order of 1/500th or 1/1,000th and even more, can in no case be explained by a cryohydratic effect (drop in the freezing point of solutions), but instead surely results from a change in the structure of this highly diluted solution.

The following examples illustrate the invention without limiting it, however. Except where otherwise indicated, the percentages are given in terms of weight.

EXAMPLE 1

Compositions have been prepared which are made up of solutions of lithium chloride and lithium iodide in dimethyl sulfoxide (DMSO).

Using a microdroplet generator, a stable aerosol of microdroplets with diameters averaging about 1 to 10 microns has been obtained.

While a comparable aerosol of DMSO is unstable because it evaporates as a result of the vapor tension increase associated with the decrease in diameter of the drops (Kelvin's law), the aerosol obtained with the aforementioned solutions of lithium chloride or lithium iodide in the DMSO is stable.

This aerosol is capable of providing a large number of condensation nucleii constituted by the microdroplets making it up.

For example, a homogeneous aerosol formed by microdroplets with diameters equal to 2 microns will provide about $2.5 \times 10^{14}$ condensation nucleii per liter.

To study the behavior of the microdroplets in a simulation of natural conditions, a spherical "condensation chamber" was constructed; it has a usable volume of 200 liters, is made of pyrex glass, and is cooled by the homogeneous, circular and peripheral circulation of glycol. The temperature of this enclosure can be regulated between +20° C. and −35° C. The supersaturation with water vapor is assured by means of adiabatic expansion. The droplet aerosol is metered using the method devised by J. S. Ryan et al. (*J. Opt. Soc. Amer.*, January 1979, No. 1, pp. 60–67).

The method used is called "laser backscattering."

It has been found that when they are placed in an atmosphere at a temperature between 0° C. and −25° C. and with an increasing relative humidity starting at about 40 percent, the microdroplets of a 5 percent solution of lithium chloride or lithium iodide in DMSO absorb sizable quantities of water vapor and form, at the saturation point with respect to supercooled water, droplets which vary in size depending on the initial conditions, but generally in the range of about 20 to 40 microns. Such droplets do not freeze even at −35° C., despite the fact that the dilution ratio in volume terms can reach values ranging from 1/100th to more than 1/1,000th.

The rate of growth of the droplets depends on the rate of change in relative humidity.

The droplets obtained remain supercooled despite the effects of dilution. It was possible to obtain a multitude of drops of the solution of "DMSO+LiCl+H$_2$O" or of "DMSO+LiI+H$_2$O" and of a size on the order of 100 microns at temperatures near or less than −40° C. without a single ice crystal appearing. There were even some supercooling at −80° C.

EXAMPLE 2

Compositions have been prepared which are made up of a solution of tripotassium phosphate in DMSO containing 5 percent sodium chloride by weight.

Comparable results were obtained by operating in a manner analogous to the one described in the preceding example.

EXAMPLE 3

Compositions have been prepared made up of solutions of urea in DMSO.

The compositions contained either 5 percent or 10 percent by weight of urea relative to the total weight of the composition.

Using a microdroplet generator, a stable microdroplet aerosol was obtained which has an average diameter of about 1 to 10 microns.

This aerosol is stable.

EXAMPLE 4

To study the behavior of the microdroplets while simulating natural conditions, the spherical condensation chamber described in example 1 is used.

Placed in a medium whose level of water vapor increases starting from about 40 percent (with respect to ice), aerosols of the DMSO-urea mixture with 5 percent urea grow and result in drops with a diameter of 30 to 40 microns at saturation with respect to water. Similar results were obtained for urea concentrations of 10 percent and 15 percent.

EXAMPLE 5

A composition has been prepared which is made up of a solution of ammonium iodide in DMSO, containing 5 percent by weight of ammonium iodide.

This composition makes it possible to obtain results comparable to those obtained with the compositions containing urea.

EXAMPLE 6

Fog dispersion.

Several tests were carried out in the Gresivaudan valley near a water surface. The fogs in question were at a temperature near but above freezing. Using a microdroplet generator, about 4 kg of a solution of 5 percent sodium chloride in DMSO, the device being aimed in the direction of the wind which was blowing at a speed on the order of 1 to 2 meters per second. The layer of fog, about 50 to 60 meters in height, was dissipated over an area of about 40 hectares. The visibility, which had been about thirty meters, was increased to 500-600 meters within a period of 15 to 20 minutes following the pulverization.

I claim:

1. A process for artificially modifying atmospheric precipitation comprising dispersing into an atmosphere capable of giving rise to precipitation microdroplets of a liquid composition containing dimethyl sulfoxide as the principal active ingredient.

2. The process of claim 1 wherein said microdroplets have average diameters ranging from 1 to 10 microns.

3. The process of claim 2 wherein said microdroplets have average diameters ranging from 1 to 6 microns.

4. The process of claim 1 wherein said liquid composition contains more than 50 percent by weight of said dimethyl sulfoxide.

5. The process of claim 1 wherein said liquid composition contains more than 80 percent by weight of said dimethyl sulfoxide.

6. The process of claim 1 wherein said liquid composition also contains at least one additional ingredient, said additional ingredient being soluble in dimethyl sulfoxide and having a vapor tension lower than that of dimethyl sulfoxide.

7. The process of claim 6 wherein said additional ingredient has a vapor tension, at most, equal to one half that of dimethyl sulfoxide.

8. The process of claim 7 wherein said additional ingredient is a solid.

9. The process of claim 8 wherein said additional material is a salt.

10. The process of claim 9 wherein said salt is selected from the chloride, iodide, nitrate, phosphate or thiocyanate or lithium, sodium, potassium, ammonium, magnesium or calcium.

11. The process of claim 6 wherein said additional ingredient is a hygroscopic material.

12. The process of claim 11 wherein said additional ingredient is sodium chloride, lithium chloride, lithium iodide or calcium chloride.

13. The process of claim 9 wherein said salt is sodium iodide, potassium iodide, lithium nitrate, sodium nitrate, potassium nitrate, ammonium nitrate, magnesium nitrate, calcium nitrate, potassium thiocyanate or magnesium chloride.

14. The process of claim 9 wherein said salt is ammonium chloride or ammonium iodide.

15. The process of claim 6 wherein said additional ingredient is a hygroscopic organic product.

16. The process of claim 15 wherein said hygroscopic organic product is urea.

17. The process of claim 6 wherein said additional ingredient is present in an amount ranging from 0.1 to 15 percent by weight of said liquid composition.

18. The process of claim 17 wherein said additional ingredient is present in an amount ranging from 1 to 10 percent by weight of said liquid composition.

19. The process of claim 1 wherein said liquid composition is dispersed into said atmosphere from a container provided with means for generating microdroplets.

20. The process of claim 1 wherein said liquid composition is dispersed in the form of microdroplets in a cloud, at the base of a cloud, in a fog area or in the frontal zone of a storm cell.

21. The process of claim 1 wherein said liquid composition is dispersed in the form of microdroplets in the very center of a hail-forming cloud prior to the formation of hailstones.

22. A liquid composition for artificially modifying atmospheric precipitation comprising an effective amount of dimethyl sulfoxide and at least one additional ingredient soluble in said dimethyl sulfoxide and having a vapor tension lower than that of dimethyl sulfoxide, said additional ingredient being present in an amount ranging from 0.1 to 15 percent by weight of said liquid composition.

23. The liquid composition of claim 22 wherein said dimethyl sulfoxide is present in an amount greater than 50 percent by weight thereof.

24. The liquid composition of claim 22 wherein said dimethyl sulfoxide is present in an amount greater than 80 percent by weight thereof.

25. The liquid composition of claim 22 wherein said additional ingredient has a vapor tension, at most, equal to one half that of dimethyl sulfoxide.

26. The liquid composition of claim 22 wherein said additional ingredient is a solid.

27. The liquid composition of claim 22 wherein said additional ingredient is a salt.

28. The liquid composition of claim 27 wherein said salt is selected from the chloride, iodide, nitrate, phosphate or thiocyanate of lithium, sodium, potassium, ammonium, magnesium or calcium.

29. The liquid composition of claim 28 wherein said salt is selected from sodium iodide, potassium iodide, lithium iodide, ammonium iodide, lithium nitrate, sodium nitrate, potassium nitrate, ammonium nitrate, magnesium nitrate, calcium nitrate, potassium thiocyanate, magnesium chloride, sodium chloride, lithium chloride, calcium chloride or ammonium chloride.

30. The liquid composition of claim 22 wherein said additional ingredient is a hygroscopic organic product.

31. The liquid composition of claim 30 wherein said hygroscopic organic product is urea.

32. A liquid composition for artificially modifying atmospheric precipitation comprising an effective amount of dimethyl sulfoxide and at least one additional ingredient soluble in said dimethyl sulfoxide and having a vapor tension lower than that of dimethyl sulfoxide, said additional ingredient being present in an amount ranging from 0.1 to 15 percent by weight of said liquid composition, said liquid composition being packaged in a container provided with means for releasing said liquid composition in microdroplet form having an average diameter ranging from 1 to 10 microns.

33. A liquid composition for artificially modifying atmospheric percipitation comprising an effective amount of dimethyl sulfoxide, said liquid composition being packaged in a container provided with means for releasing said liquid composition in microdroplet form having an average diameter ranging from 1 to 10 microns.

* * * * *